Figure 1:
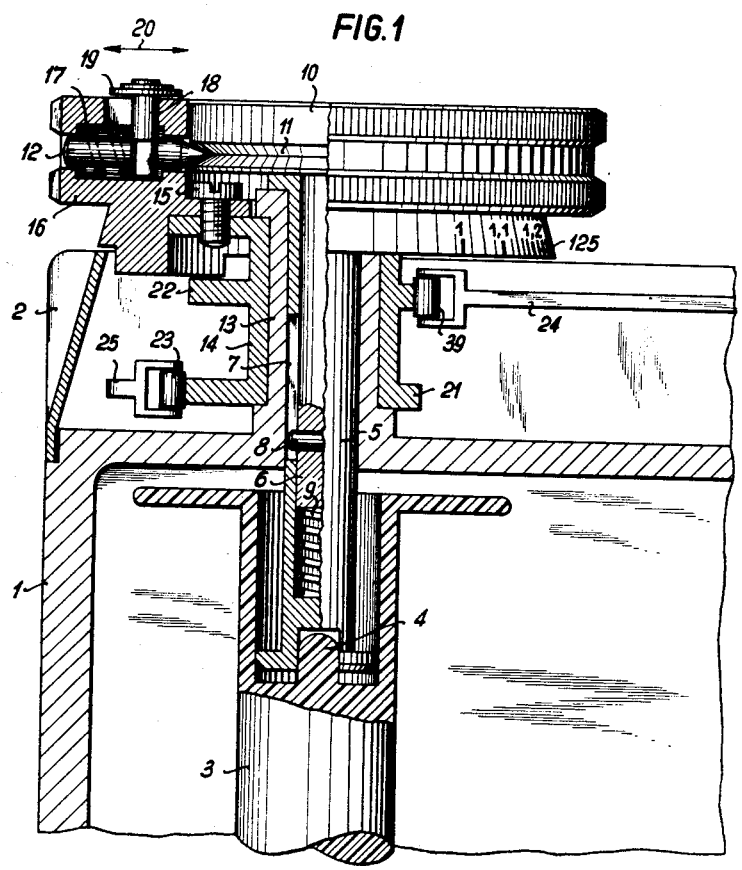

April 19, 1960  F. W. MISCHE  2,933,028
PHOTOGRAPHIC CAMERA WITH BUILT-IN RANGE-FINDER
Filed Nov. 25, 1955  5 Sheets-Sheet 2

INVENTOR
Friedrich Wilhelm MISCHE
BY Mock & Blum
ATTORNEYS

April 19, 1960  F. W. MISCHE  2,933,028
PHOTOGRAPHIC CAMERA WITH BUILT-IN RANGE-FINDER
Filed Nov. 25, 1955  5 Sheets-Sheet 3

INVENTOR
Friedrich Wilhelm MISCHE

BY  Mock & Blum

ATTORNEYS

April 19, 1960 F. W. MISCHE 2,933,028
PHOTOGRAPHIC CAMERA WITH BUILT-IN RANGE-FINDER
Filed Nov. 25, 1955 5 Sheets-Sheet 4

INVENTOR
Friedrich Wilhelm MISCHE
BY Mock & Blum
ATTORNEYS

United States Patent Office 2,933,028
Patented Apr. 19, 1960

2,933,028

PHOTOGRAPHIC CAMERA WITH BUILT-IN RANGE-FINDER

Friedrich Wilhelm Mische, Braunschweig-Gliesmarode, Germany, assignor to Voigtlander & Sohn Aktiengesellschaft, Braunschweig, Germany, a corporation of Germany Application November 25, 1955, Serial No. 549,082

Claims priority, application Switzerland August 23, 1950

8 Claims. (Cl. 95—44)

This invention relates to photographic cameras, in which adjustment of the objective and adjustment of the range-finder are simultaneously brought about by operation of a single actuating member, for example a rotatable knob, arranged on the camera. Adjustment of the objective and that of the range-finder follow different laws. Assuming that from the initial position for taking the picture of an object of infinite distance, the objective and range-finder should be adjusted for taking the picture of a near object, the situation is as follows. The adjustable member of the range-finder, for example a swinging mirror, must carry out a movement which is inversely proportional to the distance of the near object from the base of the range-finder, which is normally located approximately in the back focal plane of the objective. Displacement of the objective is inversely proportional to the distance of the object from the front focal point of the objective, i.e. to a distance which is smaller by the double of focal length. At small distance of the object, this difference amounts to a multiple of the permissible tolerance limits of lack of sharpness and cannot be disregarded. It follows that the objective must be displaced by a greater distance than that corresponding to the adjustment of the range-finder, and this additional amount of objective displacement is the greater, the nearer the object is. Therefore, the difference between the cam, for bringing about displacement of the objective, and the cam for actuating the range-finder, must increase when the distance of the object decreases. The total path of objective displacement in adjusting it from "infinite" position to a certain near focusing position, is dependent on the actual focal length of the objective, while the total path of displacement in adjusting the range-finder from infinite to near focusing position, depends on the length of the base of the range-finder, which, in general, is constant.

Simultaneous adjustment of objective and range-finder by a common adjusting member, can be carried out in two different ways. The member for causing displacement of the objective may bring about uniform movement, for example by means of a tooth gear or a cam with uniform pitch. In this case, increased displacements of the objective upon decrease of the distance of the object must be brought about by increasing movement, e.g. rotation, of the adjusting knob. However, as in the coupled range-finder only a uniform displacement is necessary for adjustment, said increasing movement of the adjusting knob must be correspondingly reduced, for example by the adjusting action of a cam, having a decreasing pitch, on the range-finder. This procedure has the disadvantage that graduation of the adjusting scale of the camera is not uniform.

According to a second procedure, non-uniform displacement of the objective is brought about by a member, e.g. a cam with increasing pitch, so that rotation of the adjusting knob over equal units of the scale corresponds to increasing or decreasing displacements of the objective. In this case, a member causing uniform displacement, e.g. a cam with uniform pitch, should be used for adjusting the range-finder.

In some known cameras the objective and range-finder are adjustable by two cams which are connected with each other and actuated by a common finger piece. Such cams are adapted to the laws, according to which movement of the objective and range-finder, respectively, takes place, but they have only one effective length which corresponds to the adjustment path of the two elements to be adjusted.

Now, in the production of cameras objectives are used which always show variations within their predetermined nominal focal length. As a result of variations in the composition of glass and of slight differences in the manufacturing conditions, objectives of identical nominal focal length show certain variations of their actual focal lengths, and the total path of displacement of such objectives in their adjustment from infinite to near focusing position is, therefore, correspondingly different. It is not possible, for practical reasons, to adapt the adjusting cams of the camera to individual objectives, and the necessary adaptation is, therefore, done by changing the scale. In view of the considerable number of variations in actual focal length, this in turn means the necessity of having correspondingly large number of scales in stock, from which a suitable scale can be selected in each case.

According to the present invention, this difficulty is eliminated by using for adjustment of the objective a cam of hyperbolic shape and for the adjustment of the range-finder an Archimedean cam, said cams being fixedly connected with each other and are fixedly but adjustably applied to the actuating member, e.g. the adjusting knob. Thus, the objective is adjusted by a spiral of increasing pitch, which corresponds to the necessary increase of displacement, and the range-finder is adjusted by a spiral of uniform pitch, which corresponds to the law followed by the displacement of the range-finder.

In view of the adjustability between the actuating organ and the member carrying the cams, it is possible, according to the invention, to select the suitable portion of the cam for each individual objective and to cause it to act on the displacement gear of the objective, which causes displacement of the individual objectives inserted in the camera, from infinite to near focusing position, upon equal turning of the actuating knob, e.g. by using always the same scale.

A regulating means inserted in the transmission gear between the objective and its cam serves for regulation of sharp focusing of the objective in conformity with the position of the actuating finger piece and the scale applied thereto. The change in the position of the range-finder cam, which occurs during regulation of the objective cam, does not affect the range-finder adjustment proper, because the Archimedean spiral has the same pitch in all parts and, therefore, always meets the requirement of uniform displacement of the range-finder.

Adjustment of the position of the cam body causes, of course, displacement of the movable mirror or prism of the range-finder. This displacement can be corrected in simple manner after adjustment of the objective cam, by using the conventional adjusting means present in every range-finder.

Thus, objectives of equal nominal focal length, which, however, have slightly different actual focal lengths, can be displaced over the total path of adjustment, i.e. from near focusing to infinite position, by equal rotation of the adjusting knob and with the same scale, whereby the range-finder is adjusted correspondingly at the same time.

According to a preferred embodiment of the invention, the hyperbolic cam and the Archimedean cam form a uniform piece whereby manufacture of the cams is simplified. The cam bodies according to the invention have a greater effective length than the total path of displacement, so that a suitable portion of the cam can be selected and used in combination with individual objectives.

The device for regulating the position of the objective is preferably inserted in the transmission gear for the objective. According to a preferred embodiment, it consists of a rotatable screw fastened to a member of the transmission gear, e.g. the contact lever for the objective cam, and a slide which is displaceable on this member and engages an adjusting lever acting on the objective.

In the cameras according to the present invention, the actuating means for adjusting the objective and range-finder has, in general, a common axis with an actuating means for the film transport, preferably with the axis of a film spool.

Figure 2:
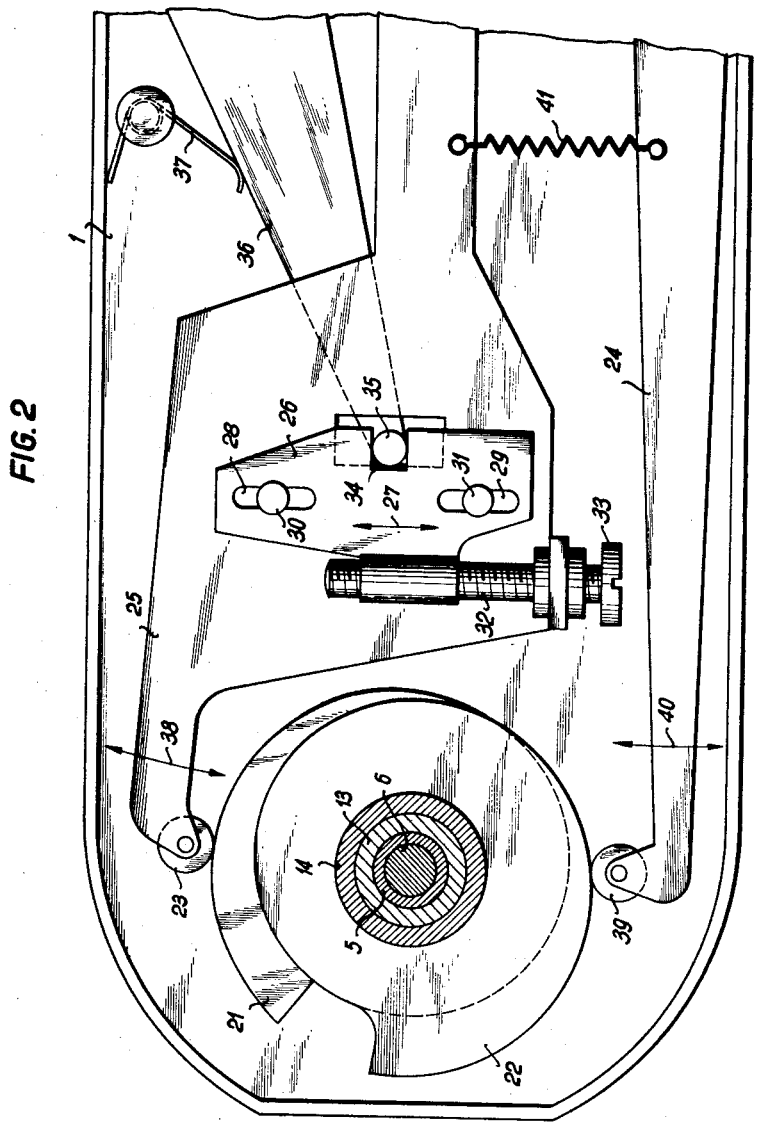
Figure 3:
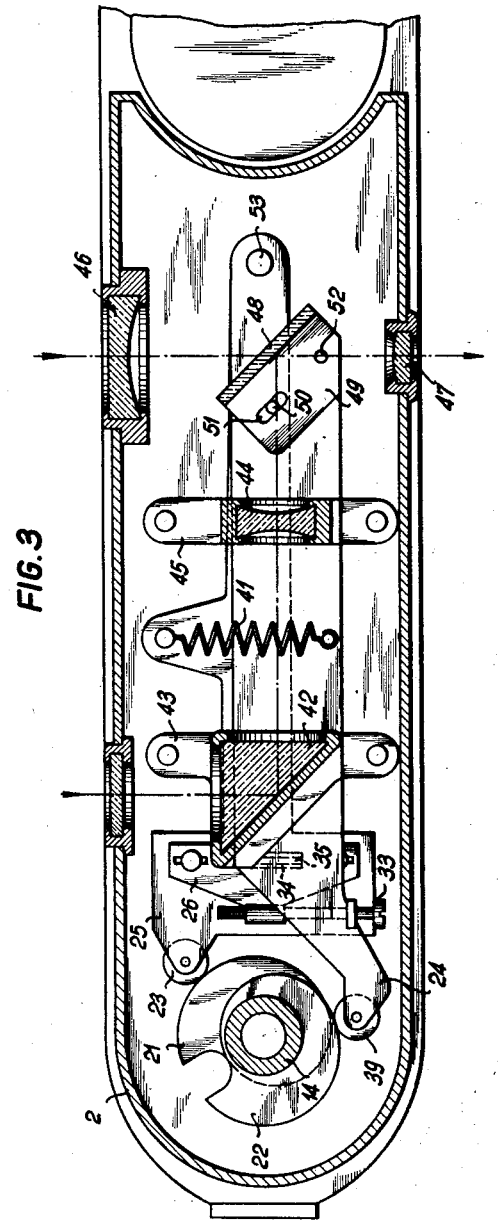
Figure 4:
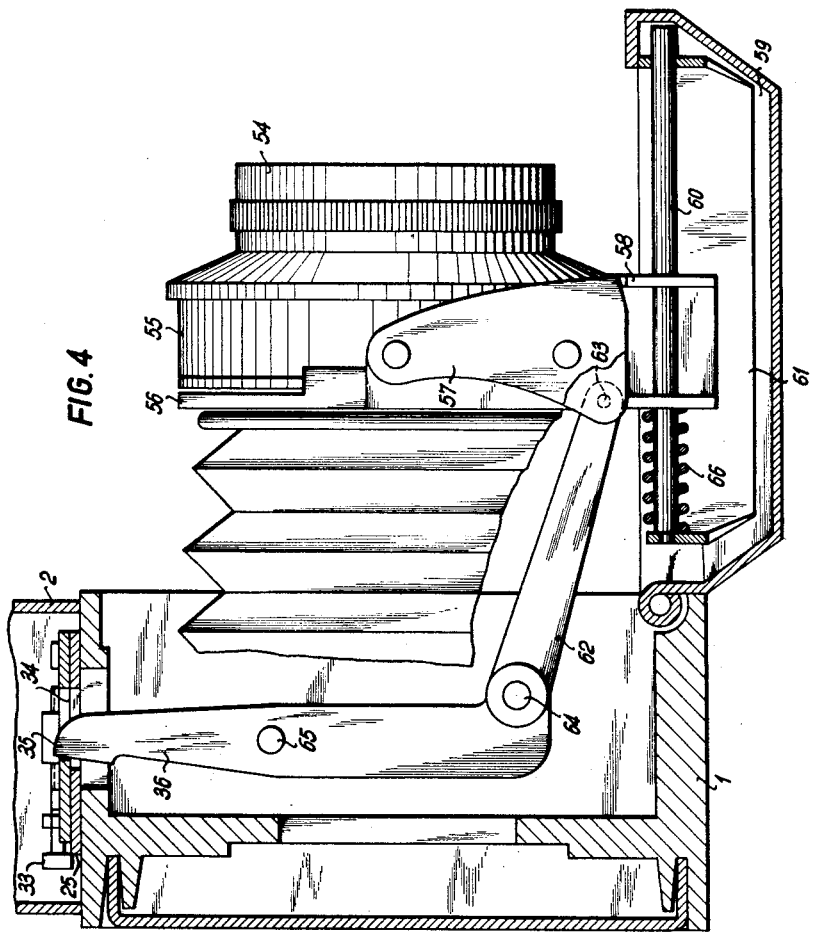
Figure 5:
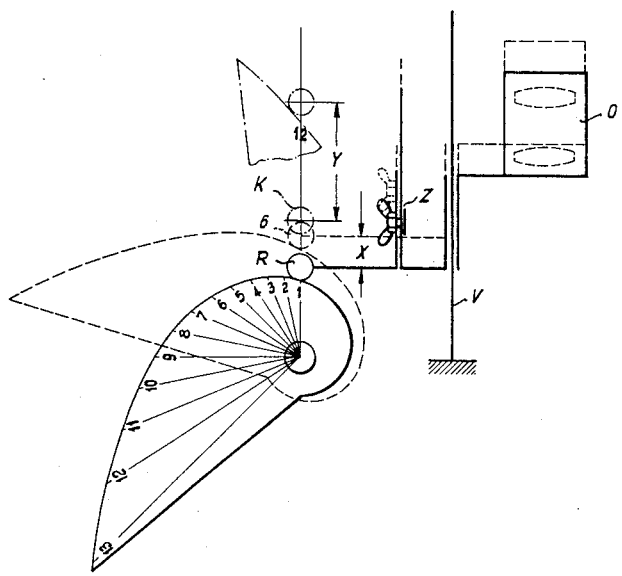

Figure 1 illustrates application of the invention to a roll-film camera, in which the actuating means for adjustment of the range-finder and extension of the objective form a structural unit with the actuating means for winding back the film. However, the invention can also be applied independently from the film drive. The example illustrated in Figure 1 has been selected in order to show that the invention can be conveniently applied to the most modern types of cameras. In order to facilitate understanding of Figure 1, which shows part of the camera in section, those elements which have no direct bearing on the present invention, but have been included in Figure 1 in order to fully explain functioning of the device, are also described hereinafter, for the sake of clarity. The position of the transmission levers bearing against the cams has been shown in a somewhat staggered arrangement (staggered by about 90°), which is different from that illustrated in Figure 2. Figure 2 is a diagrammatical, horizontal section through the camera. Figure 3 is a horizontal sectional view through a camera provided with cams, range-finder and contact levers for the objective and for the range-finder, controlled by cams. Figure 4 illustrates in longitudinal sectional view the parts bringing about displacement of the objective, the lever diagrammatically shown in Figure 2 being illustrated in Fig. 4 in a somewhat modified form and arrangement. Fig. 5 diagrammatically illustrates a hyperbolic spiral and its use according to the invention.

In Figure 1, reference numeral 1 denotes the camera body, which is only partially shown in Figure 1. The camera body proper is provided, in a conventional manner, with a so-called top plate 2, which houses actuating, switching, counting and like elements. 3 denotes a film spool, preferably the spool for winding back the film. It is coupled, in conventional manner, with the actuating member of the film winding device, as indicated at 4. This is done by providing a stationary hollow shaft 5, in which another shaft 6 can be glidably displaced. Axial displacement of the latter is limited by slot 7 of hollow shaft 5 and by pin 8 of displaceable shaft 6. Spring 9 constantly tends to press displaceable shaft 6 outward. Displaceable shaft 6 carries at its upper end, a rotatable knob 10. The latter is provided with a peripheral groove 11, which is engaged by outer bolt 12. Knob 10 cannot be advanced into the actuating position, unless bolt 12 is withdrawn. The release step will be described further below. Shaft 5 is encompassed by the stationary and undisplaceable sleeve 13. This guide sleeve may form an integral part of camera body 1, as shown in Figure 1. A second sleeve or bushing 14 is arranged rotatably but in axially not displaceable manner on sleeve 13.

This second sleeve is firmly connected by means of a screw 15 or the like, with rotatable knob 16, which serves for actuation of adjusting means for the objective and the range-finder. Knob 16 is hollowed out, so that rotary knob 10 of the film transport can be sunk in knob 16. The before mentioned bolt 12, which is housed by knob 16, is constantly held in engagement with the rotary knob of the film transport, by means of spring 17. Pin 18 is firmly connected with bolt 12. The upper end of pin 18, which projects beyond the outer surface of adjusting knob 16, is provided with a knob-like grip 19. Arrow 20 indicates that pin 18, together with bolt 12, can be displaced to the left, against the effect of spring 17, so that film control knob 10 is released.

In the embodiment shown, two cams 21 and 22 are fastened to rotatable sleeve 14, and, preferably, they form integral parts of sleeve 14. In the embodiment illustrated in Figure 1, the lower cam 21 serves for actuation of the objective extension and a lever arrangement, not shown in detail bears elastically against the same; this indicated by roll 23 in Figure 1. This lever arrangement leads to the objective board in conventional manner. A lever merely indicated at 24 bears against the second cam 22 by means of roll 39, and this lever brings about adjustment of the range-finder, for example swinging of the mirror, by the usual transmission means. Upon turning adjusting knob 16, sleeve 14 is also turned so that different sections of cams 21, 22, come in contact with transmitting elements 23, 24 and 39. In the embodiment according to Figure 1, upper cam 22 has an equal pitch per angle unit, i.e. it is designed as an Archimedean spiral. In the design of the lower cam 21, a steadily increasing pitch is present per angle unit. This curve can be denoted as a hyperbolic spiral. Thus, turning of adjusting knob 16 yields simultaneously proper adjustment of the rangefinder, as well as exact adjustment of the objective. Of course, an adjusting device for assembling is provided. The latter is shown in Figure 2. Reference numeral 125 denotes the distance scale on the bottom of knob 16.

Figure 2, shows again cam 21 for adjustment of the objective and cam 22 for adjustment of the rangefinder. 14 denotes a sleeve, to which the cams are firmly connected, or with which they form an integral piece. By roll 23, contact lever 25 bears against hyperbolic cam 21. The other end of this lever 25 (i.e. the right end in the drawing) is not shown in Fig. 2. It is pivotally connected to a stationary point in the camera casing.

A slide 26 is slidably arranged on lever 25. Its sliding movement in the direction of arrow 27 is limited by slots 28 and 29 and pins 30 and 31 fastened to lever 25. Slide 26 can be displaced by means of screw 32, which can be adjusted at its head 33. Slide 26 is provided with a recess 34, into which end 35 of a lever 36 projects, and this lever, if necessary in combination with other intermediate members, leads to the objective. Spring 37 fastened to the camera casing, urges transmission lever 36 and, thus, contact lever 25 in the direction of arrow 38, so that roll 23 of lever 25 bears against hyperbolic cam 21. Adjusting lever 24 leads to the rangefinder, the details of this connection being omitted in Figure 2. This lever 24 bears by means of its roll 39 in the direction of arrow 40 against the Archimedean spiral 22. Spring 41, one end of which is connected to lever 24 and the other to lever 25 in the embodiment shown, provides for permanent contact.

In adjusting the device, lever 24 is first lifted from cam 22. Cam 21 is now turned by means of knob 16 until adjustment to infinite distance and adjustment to near object of the inserted object yield sharp images, in conformity with adjusting scale 125, which is adjusted to the corresponding mark on the camera body and is fastened in this position, by a screw or the like to button 16. By turning screw head 33, slide 26 is adjusted so that roll 23 of lever 25 will bear against cam 21 in the respective case. After adjustment of the objective in connection with its adjusting cam 21 is completed, both ends of spring 41 are fastened, as indicated in Figure 2, and lever 24 is thus caused to bear by its roller 39 against Archimedean cam 22. The necessary adjustment is then brought about in the rangefinder proper.

In Figure 3, prism 42 is held by prism carrier 43, negative lens 44 in lens carrier 45, ocular 47 in top plate 2, firmly in the camera. The movable part of the rangefinder is mirror 48, which is adjustably connected by means of carrier member 49 to swinging lever 24. Regulation of the mirror is effected by means of turnable eccentric pin 50, which causes swinging of mirror 48 upon turning in slot 51 of member 49. The pivotal point of member 49 is also the pivotal point 52 of swinging lever 24, which is connected with contact lever 25 for adjustment of the objective, by means of spring 41 and is thus permanently drawn to cam 22. While Archimedean cam 22 acts over roller 39 on swinging lever 24 and thus brings about adjustment of the rangefinder hyperbolic cam 21 having an opposite pitch, causes over roller 23 movement of lever 25, which is pivoted at 53, whereby lever end 35, which engages opening 34 of two-part lever 25, is carried along and the objective is displaced. By means of regulating screw 33, the right portion (in the drawing) of lever 25 can be displaced whereby the objective will be adjusted over lever end 35.

Figure 4 illustrates the lever system for displacing and guiding the objective. Objective 54 in shutter 55 is fastened to objective board 56 and forms with member 57 in taking position a firm unit which is separated only upon swinging of base-board 59, i.e. upon closing and opening the camera. The objective is guided by sliding arrangement of guide member 58 on two rods 60, which are fastened in base-board 59 by means of supporting members 61. Displacement or adjustment of the objective is brought about by connection of member 57 with transmission lever 36 by means of rod 62 at joints 63 and 64. The double-armed transmission lever 36, the upper end of which engages lever 25, is pivotally connected on the inner side wall of casing 1 at 65. Upper lever end 35 is pressed within slot 34 against contact lever 25 by the effect of spring 66, which is arranged on one of the rods 60. Spring 66 shown in Figure 4 corresponds in its function to spring 37 shown in the somewhat different embodiment of Figure 2.

Operation and use of the device is as follows: After insertion of an objective in the camera, the conventional adjusting knob 16 (shown in Fig. 1, but not visible in the sections of Figs. 2–5), which is connected with the cams, is turned to the taking "infinite" position, and the objective is then adjusted to sharp focusing on the ground glass by means of adjusting screw 33. Subsequently, the adjusting knob is turned to the smallest near focusing position, e.g. 1 m. Sharpness of the image is checked also in this position on the ground glass. If the sharpness is not satisfactory, the adjusting knob is turned back to the infinite position and the cam body is separated from said knob. The adjusting knob is now turned to some extent and then connected again with the cam body, and the objective position is now corrected by means of adjusting screw 33 until the image on the ground glass is sharp again. These adjustments are repeated until the image on the ground glass is sharp also in near focusing at 1 m. As soon as this is the case, mirror 48 of the rangefinder is regulated by means of eccentric pin 50. This can be done in infinite or near focusing position.

Photographic objectives manufactured with a predetermined nominal focal length, for example 50 mm., are never identically equal, in spite of greatest care observed in their manufacture. Owing to slight variations in the composition of glass or other unavoidable variations in manufacturing conditions, there are certain variations particularly in the focal length of the objectives. For example, one of the objectives manufactured and sold with a nominal focal length of 50 mm., may have an actual focal length of exactly 47 mm., while another objective of the same batch has an actual focal length of, for example 52 mm. These variations of the objectives have to be taken into consideration, when the objectives are built into cameras, in order to obtain correct adjustment of the distance. Very exact adjustment is extremely important for obtaining sharp photographic pictures, particularly in the use of modern objectives of high relative aperture, because in the use of a widely open objective, for example a diaphragm aperture 1:2 or 1:1.5, and at a small distance, the depth of field is very small and even slight errors in adjustment may result in not sufficiently sharp pictures.

In order to eliminate errors, previously it was necessary to use a considerable stock of different scales of distances, in order to have available scales fitting to individual objectives of varying actual focal lengths. The situation was still more difficult if the scale was not located on the camera, but on the adjusting knob proper, and in this case it was necessary to keep a considerable stock of different knobs. For these reasons it was previously necessary to use a stock of, for example, not less than 30 different scales or knobs, in the construction of a single camera type.

These inconveniences resulted in the following problem:

Every camera is provided with an adjusting member, e.g. an adjusting knob. The problem consisted in providing an adjusting member, the adjusting movement, e.g. rotation, of which remains within constant limits for any objective of the same predetermined nominal focal length, i.e. irrespective of the before-mentioned variations of the actual focal length. In other words, the range of movement of the adjusting knob, or the like, should always correspond to the path of adjustment of an objective which has the same predetermined nominal focal length. Associated with the button or applied to it is a scale which has a range from the smallest distance, e.g. 1 m., to the "infinity" position.

In order to render the same scale applicable to an objective of any actual focal length within the predetermined nominal value, in the gear between knob and objective a means is inserted, in the use of which no change in the range of movement of the knob, or change in the scale applied to the knob, is necessary, even if objectives having different actual focal lengths within the predetermined nominal focal length, are built into the camera.

It has been found that the above outlined problem can be solved by the combined use of a hyperbolic spiral and an Archimedean spiral, as described above and illustrated in Figs. 1–4.

The shape and application of a hyperbolic spiral is diagrammatically illustrated in Fig. 5. This figure also indicates an objective O, which is supposed to be displaced by roller R, which lies against the cam. V is a rod for guiding objective O and the transmission members, upon movement of the cam.

It is assumed that, depending on its focal length, an objective should be displaced by the distance X in order to effect adjustment in the range between "infinite" position and focusing for near object, and that in this case the cam must be turned for example by 5 equal sectors, i.e. 1–6. Displacement of roller R and the parts affected by it by distance X are shown in the drawing.

In the case of another objective, which requires displacement by distance Y for adjustment between "infinite" position and focusing for near object, in accordance with the fact that the adjusting scale is not exchanged, again only 5 sectors of the spiral should be used in the rotation by the knob 16, which causes rotation of the hyperbolic cam. Therefore, in this case another fraction of the cam should be selected, which owing to its higher pitch, is capable of causing displacement Y by means of 5 sectors only of the spiral. Sectors 7–12 can be used in this case. Therefore, the cam must be separated from the adjusting knob, not shown, and rotated until the cam lies at point 7 against roller R, which now takes the position K shown in dotted line. This would be the starting position, i.e. the "infinite" position, in which cam and knob are now again fixedly connected with each other.

The above described regulation takes place only once, as a part of the adjustment of the camera, before the camera is made ready for shipment in the factory. After this regulation has taken place, no further adjustment is necessary. As a result of the above described preliminary regulation prior to shipment of the camera, rotation of the adjusting knob corresponds to the actual focal length of the objective of the respective camera, i.e. the use of the proper portion of the hyperbolic cam results in imparting the proper displacement to the objective, upon turning the adjusting knob.

The above described preliminary regulation of cam and adjusting knob causes a change also in the position of the objective, i.e. after the adjustment the objective will not be in its proper "infinite" position. Therefore, the objective must be brought again into the infinite position, i.e. it must be displaced until—in conformity with the new infinite position on the cam—it yields a sharp image. This is done by means of a particular adjusting member, which is shown in Fig. 5 as a releasable screw connection Z, and in the drawings as adjusting screw 33. In contrast to the exaggerated illustration of Fig. 5 in practice the displacements will be smaller and the individual paths of displacement will not be located separately one behind the other (as they appear in Fig. 5). If the variations in the actual focal length are relatively small, only small displacements of the hyperbolic cam will be necessary for regulation.

It will be understood from the above, that in the arrangement of the present invention, the use of objectives having actual focal lengths differing from the nominal focal length, does not necessitate change of the scale or the rotation path of the adjusting knob. In order to regulate the spiral in the above described manner, the spiral cam must be separably connected with the adjusting knob. Thus, during regulation, it may become necessary to separate the spiral cam several times from the knob and connect it with the knob again by means of a screw, or the like, subsequently. However, after this has been done, the regulation will be final and in taking pictures any sharp focusing to the distance of the individual case will be obtained with great exactness.

Simultaneously with the regulation of the objective, the range-finder must be also set by the same adjusting knob in the same range between near focusing and infinite positions, and therefore the two elements bringing about these adjustments must be coupled. However, movement of the range-finder takes place in a constant manner, i.e. according to another law than that of the objective. Therefore, a hyperbolic spiral cannot be used in connection with the range-finder. In order to obtain the constant displacement of the range-finder, in carrying out the invention the hyperbolic spiral is combined with an Archimedean spiral, which, as known, has a constant pitch.

According to an important feature of the invention, the two cams are in fixed connection with, i.e. not movable relative to, each other and preferably they are made of one piece.

A cam body consisting of the two above described cams meets all requirements with regard to the adjustment of the objective, as well as the range-finder.

In the use of the hyperbolic spiral, it is necessary—as pointed out above—that in the case of an objective of a predetermined actual focal length the control member or roller lie against a suitable predetermined portion of the cam, in order to obtain the desired exact displacement.

In contrast to this it is irrelevant by what portion the Archimedean spiral cam acts on the roller or the like of the range finder, because the pitch of the Archimedean spiral is constant in all parts thereof.

Therefore, it will be necessary to use a construction, in which the before mentioned regulation of the hyperbolic spiral, the control member of the range-finder should remain in co-action with the Archimedean spiral, i.e. lie against the latter. In practice this is done in simple manner by a spring which keeps said control member of the range-finder constantly in engagement with the Archimedean spiral.

In addition, the displacement of the range-finder caused by regulation of the hyperbolic spiral, must be compensated for, because said regulation causes displacement of the movable mirror. Therefore, the mirror must be adjusted by using the conventional adjusting means which are present in the range-finder anyhow, and are shown in the appended drawings.

The extent of rotating movement of the adjusting knob of the camera relative to an invariable scale, from near focusing to infinite position, has a fixed value. In the manufacture and regulation of the camera, the following steps are carried out according to the invention:

(1) The objective is inserted in the camera;
(2) The adjusting knob is turned to the infinite position;
(3) The objective is adjusted at infinite position to sharp focusing of a remote object on the ground-glass plate by means of adjusting screw 33;
(4) The adjusting knob is turned to 1 m., i.e. the smallest near focusing distance;
(5) The sharpness of the image on the ground-glass plate is checked.
(6) If the image at 1 m. is not sharp, the adjusting knob is reset to infinite position, separated from the cam, the cam is turned and fixedly connected again with the adjusting knob.
(7) The objective displacement is corrected by screw 33, until the image on the ground-glass plate is sharp again;
(8) Steps 2–7 are repeated until a sharp image is obtained on the ground-glass plate in the infinite, as well as in the near focusing position of 1 m.;
(9) Mirror 48 of the range-finder is now regulated by means of eccentric pin 50. It does not matter whether this is done in infinite position or at near focusing.

It will be understood that the present invention is not limited to the specific elements, steps and other specific details described above and can be carried out with various modifications. For example, while it is preferred to use the film spool for bringing about advance of the film, it is within the scope of the present invention to transmit motion of the axis of the film spool, either directly or by means of a toothed gear, to another element, for example a small shaft which may be provided with teeth for engaging perforations of the film, and in such a case said shaft serves as a means for advancing the film. This and other modifications can be made without departing from the scope of the invention as defined in the appended claims.

Reference is made to my co-pending application filed under Ser. No. 243,124, for "Photographic Camera With Built-in Rangefinder," on August 22, 1951, now abandoned, of which this is a continuation-in-part.

What is claimed is:

1. A photographic camera comprising an adjustable objective, a range-finder and an actuating member arranged on the camera casing, for simultaneous adjustment of the objective and the range-finder; a one-piece cam member operated by said actuating member, said cam member comprising a first cam and a second cam, first and second transmission means between said first and second cams respectively, and the objective and range-finder respectively, said first cam curved in the shape of a hyperbolic spiral for adjustment, over said first transmission means, of the objective, said second cam curved in the shape of an Archimedean spiral for adjustment, over said second transmission means, of the range-finder; said one-piece cam member being capable of displacement relative to the transmission means, in order to effect said adjustments of the objective and range-finder by different portions of the operating surface of said first cam and second cam, respectively, in order to adapt the adjusting effect of said first cam, on the objective, to the focal length of individual objectives, while the adjusting effect of said second cam, on the range-finder, remains unchanged; means for fixedly adjusting said cams relative to said actuating member in conformity with the actual focal length of the objective in the camera, in order to cause to act a corresponding portion of the first cam, over the transmission means, for the objective in conformity with its actual focal length, between infinite and near focusing position.

2. A photographic camera as claimed in claim 1, in which the length of each cam exceeds the length corresponding to the total path of displacement.

3. A photographic camera as claimed in claim 1, in which the actuating member has a predetermined, limited range of movement and is provided with an invariable scale extending from infinite to near focusing position, said range corresponding to said scale.

4. A photographic camera as claimed in claim 1, in which adjusting means for regulating the position of the obective are inserted in the transmission means between the first cam and the objective.

5. A photographic camera as claimed in claim 1, in which adjusting means for regulating the position of the objective are inserted in the transmission means between the first cam and the objective, said adjusting means comprising essentially an adjustable screw and a slide displaceable by said screw and acting on an adjusting lever for the objective.

6. A photographic camera as claimed in claim 1, in which adjusting means for regulating the position of the objective are inserted in the transmission means between the first cam and the objective, said adjusting means comprising essentially an adjustable screw fastened to said adjusting means, and a slide displaceable by said screw and acting on an adjusting lever for the objective.

7. A photographic camera as claimed in claim 1, in which the range-finder is provided with regulation means.

8. A photographic camera comprising an actuating member arranged at the camera casing, for simultaneous adjustment of the objective and the range-finder by a one-piece member comprising a first cam and a second cam, first and second transmission means between said first and second cams respectively, and the objective and range-finder respectively, said first cam adjusting the objective over said first transmission means, said second cam adjusting the range-finder over said second transmission means; said first cam corresponding to a hyperbolic spiral and said second cam corresponding to an Archimedean spiral; said one-piece member being adapted to be displaced relative to the transmission means in order to adjust said first cam to the actual focal length of the objective by causing to act on the objective over said first transmission means, a different portion of the operating surface of said first cam and causing to act on the range-finder over said second transmission means a different portion of the operating surface of said second cam, whereby no change in the adjusting action thereof on the range-finder occurs; means for adjusting and fixing said cams relative to said actuating member in conformity with the actual focal length of the camera objective in order to cause to act a corresponding portion of the first cam on the objective in conformity with its actual focal length, between infinite and near focusing positions.

References Cited in the file of this patent

UNITED STATES PATENTS

| | | |
|---|---|---|
| 1,555,142 | Miller | Sept. 29, 1925 |
| 2,380,453 | Lateiner | July 31, 1945 |

FOREIGN PATENTS

| | | |
|---|---|---|
| 570,716 | Germany | Feb. 18, 1933 |
| 578,612 | Germany | June 15, 1933 |
| 593,892 | Germany | Mar. 6, 1934 |
| 683,126 | Germany | Oct. 30, 1939 |